US007729666B2

United States Patent
Zhang et al.

(10) Patent No.: US 7,729,666 B2
(45) Date of Patent: Jun. 1, 2010

(54) COMMUNICATION SYSTEM AND METHOD OF DYNAMIC SPACE-FREQUENCY-DIVISION MULTIPLE-ACCESS FOR UPLINK FROM TERMINALS TO BASE-STATION

(75) Inventors: Zhan Zhang, Beijing (CN); Hidetoshi Kayama, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 626 days.

(21) Appl. No.: 11/648,349

(22) Filed: Dec. 28, 2006

(65) Prior Publication Data

US 2007/0291640 A1    Dec. 20, 2007

(30) Foreign Application Priority Data

Dec. 29, 2005    (CN) .................. 2005 1 0135998

(51) Int. Cl.
*H04W 24/00*    (2009.01)
(52) U.S. Cl. ..................... 455/88; 455/434; 455/62; 714/712; 714/746
(58) Field of Classification Search .......... 455/456, 455/92, 456.5, 434, 62; 370/210; 714/714, 714/746
See application file for complete search history.

(56) References Cited

U.S. PATENT DOCUMENTS

2002/0147953 A1* 10/2002 Catreux et al. .............. 714/746

* cited by examiner

*Primary Examiner*—Nick Corsaro
*Assistant Examiner*—Quan M Hua
(74) *Attorney, Agent, or Firm*—Blakely, Sokoloff, Taylor & Zafman LLP (57) ABSTRACT

Embodiments of the present invention include a system and method of dynamic space-frequency-division multiple-access for the uplink from terminals to a base-station. The system includes a base-station and multiple terminals. According to different spatial mapping modes, the base-station performs an optimization computation using an optimization function in order to obtain control information for controlling terminals; after receiving the control information, the user terminal controls the transmitting mode using this control information. The method includes the following operations: at the base-station, performing an optimization computation using an optimization function according to different spatial mapping modes respectively, in order to obtain control information for controlling terminals; at the user terminal, controlling a transmitting mode using the control information after receiving the above control information. An embodiment of the present invention can achieve a higher system capacity by balancing resource allocation among different users in a domain of transmission power, bandwidth and spatial channels.

12 Claims, 4 Drawing Sheets

COMMUNICATION SYSTEM AND METHOD OF DYNAMIC SPACE-FREQUENCY-DIVISION MULTIPLE-ACCESS FOR UPLINK FROM TERMINALS TO BASE-STATION

PRIORITY

The present application claims priority to and incorporates by reference the entire contents of Chinese priority document 200510135998.7, filed in China on Dec. 29, 2005.

FIELD OF THE INVENTION

The present invention relates to a wireless communication field and more particularly to a communication system and method of dynamic space-frequency-division of uplink from terminals to a base-station.

BACKGROUND OF THE INVENTION

In the future 4G wireless communication systems, higher rate services of some users require a higher transmission rate and different mobile terminals which require different low rates need to share wireless frequency resources. However, a conflict between limited wireless frequency resources and increasing wireless communication link requirement is intensified.

The following references [1] to [6] analyze the signal multiplexing modes required by the 4G wireless communication system. A multiple-carrier transmission is recommended as a better 4G wireless technique than a single-carrier transmission. At the same time, a system solution with a multi-input and multi-output using multiple antennas is one of the recommended features of the 4G wireless communication system.

[1] N. S. J. Chuang, "Beyond 3G: wideband wireless data access based on OFDM and dynamic packet assignment," IEEE Commun. Mag., pp. 78-87, July 2000.

[2] A. Ghosh, D. R. Wolter, J. G. Andrews, R. Chen, "Broadband wireless access with wimax/802.16: current performance benchmarks and future potential," IEEE Commun. Mag., vol. 43, no. 2, pp. 129-136, February 2005.

[3] G. L. Stuber, J. R. Barry, S. W. Mclaughlin, Y. Li, M. A. Ingram, T. G. Pratt, "Broadband MIMO-OFDM wireless communications," Proceedings of the IEEE, vol. 92, no. 2, pp. 271-294, February 2004.

[4] H. Sampath, S. Talwar, J. Tellado, V. Erceg, A. Paulraj, "A fourth generation MIMO-OFDM broadband wireless system: design, performance, and field trial results," IEEE Commun. Mag., vol. 40, no. 9, pp. 143-149, September 2002.

[5] L. L. Yang, L. Hanzo, "Multi-carrier DS-CDMA: A multiple-access scheme for ubiquitous broadband wireless communications," IEEE Commun. Mag., pp. 116-124, October 2003.

[6] B. G. Evans, K. Baughan, "Visions of 4G" Electronics and Communication.

In a traditional OFDMA uplink system, since a fixed frequency band is used for communication and the different channel states and statistic characteristics of noise and interferences are not taken into account, the frequency resource cannot be fully utilized. A channel capacity provided by the OFDMA system is far different from that deduced by The Information Theory.

With multi-antenna technology, different users can share a wireless channel by different spatial channels in a same subcarrier or using different subcarriers or the combination of these two. However, adding a resource for one user means reducing a resource for another user. A typical case is that for users using different spatial channels in the co-frequency channels, when a power of one user increases, interference on other users will increase.

The following references [7] to [19] analyze multiple antenna technologies, signal multiplexing modes, corresponding system capacities and methods for increasing system capacity. A common sense in these references is that in a domain of transmission power, bandwidth and spatial channel, resource allocation should be balanced among different users in order to achieve a higher system capacity.

[7] L. L. Yang, L. Hanzo, "Software-defined-radio-assisted adaptive broadband frequency hopping multicarrier DS-CDMA," IEEE Commun. Mag., pp. 174-183, March 2002.

[8] E. Telatar, "Capacity of multi-antenna Gaussian channels," European Trans. on Telecommun., vol. 10, no. 6, pp. 585-595, November/December 1999.

[9] D. Tse and P. Viswanath, Fundamentals of Wireless Communication. Cambridge University Press, May 2005.

[10] M. Gharavi-Alkhansari, A. B. Gershman, "Fast antenna subset selection in MIMO systems," IEEE Trans. Signal Processing, vol. 52, no. 2, pp. 339-347, February 2004.

[11] E. A. Jorswieck, H. Boche, "Performance analysis of capacity of MIMO systems under multiuser interference based on worst-case noise behavior," EURASIP Journal on Wireless Communications and Networking, vol. 2, pp. 273-285, 2004.

[12] S. Serbetli, A. Yener, "Time-slotted multiuser MIMO systems: beamforming and scheduling strategies," EURASIP Journal on Wireless Communications and Networking, vol. 2, pp. 286-296, 2004.

[13] R. S. Blum, J. H. Winters, N. R. Sollenberger, "On the capacity of cellular systems with MIMO", IEEE Commun. Lett., vol. 6, pp. 242-244, June 2002.

[14] H. Boche, E. A. Jorswieck, "Sum capacity optimization of the MIMO Gaussian MAC", The 5th International Symposium on Wireless Personal Multimedia Communications, vol. 1, pp. 130-134, 27-30 October 2002.

[15] S. Serbetli, A. Yener, "Transceiver optimization for multiuser MIMO systems," IEEE Trans. Signal Processing, vol. 52, no. 1, pp. 214-226, January 2004.

[16] E. A. Jorswieck, H. Boche, "Transmission strategies for the MIMO MAC with MMSE receiver: average MSE optimization and achievable individual MSE region," IEEE Trans. Signal Processing, vol. 51, no. 11, pp. 2872-2881, November 2003.

[17] K. N. Lau, "Analytical framework for multiuser uplink MIMO spacetime scheduling design with convex utility functions," IEEE Trans. Wireless Commun., vol. 3, no. 9, pp. 1832-1843, September 2004.

[18] D. P. Palomar, J. M. Cioffi, M. A. Lagunas, "Joint Tx-Rx beamforming design for multicarrier MIMO channels: a unified framework for convex optimization", IEEE Trans. Signal Processing, vol. 51, no. 9, pp. 2381-2401, September 2003.

[19] Wonjong Rhee, W. Yu, J. M. Cioffi, "The optimality of beamforming in uplink multiuser wireless systems," IEEE Trans. Wireless Commun., vol. 3, no. 1, pp. 86-96, January 2004.

Based on the above references, the present invention provides a communication systems and method of dynamic space-frequency-division multiple-access for uplink from terminals to a base-station.

SUMMARY OF THE INVENTION

A communication system and method of dynamic space-frequency-division multiple-access for uplink from terminals to base-station are described. In one embodiment, a communication system with dynamic space-frequency-division multiple-access for uplink from terminals to a base-station, comprising a base-station and multiple terminals, wherein, the base-station, according to different spatial mapping modes, performs an optimization computation using an optimization function in order to obtain control information for controlling terminals; and the user terminal, after receiving the control information, controls the transmitting mode using the control information.

DETAILED DESCRIPTION

One embodiment of the present invention comprises a communication system of dynamic space-frequency-division multiple-access for uplink from terminals to a base-station.

Another embodiment of the present invention comprises a communication method of dynamic space-frequency-division multiple-access for uplink from terminals to a base-station.

The communication system of dynamic space-frequency-division multiple-access for uplink from terminals to a base-station includes a base-station and multiple terminals. According to different spatial mapping modes, the base-station performs an optimization computation using an optimization function in order to obtain control information for controlling terminals; after receiving the control information, the user terminal controls the transmitting mode using the control information.

The communication method of dynamic space-frequency-division multiple-access for uplink from terminals to a base-station includes the following operations:

first, at the base-station, performing an optimization computation using an optimization function according to different spatial mapping modes, in order to obtain control information for controlling terminals;

second, at the terminal, controlling a transmitting mode of a transmitter using the control information after receiving the control information.

Compared with prior arts, the present invention can achieve a higher system capacity and increase the utilization of frequency resource by balancing resource allocation among different users in a domain of transmission power, bandwidth and spatial channel. The result is that the contradiction between limited wireless frequency resources and increasing wireless communication link requirement is effectively mitigated.

It is the core consideration and theoretic base of the present invention to balance resource allocation among different users in a domain of transmission power, bandwidth and spatial channel mentioned in the above references [7] to [19] and to achieve a higher system capacity. This theory is embodied in the computation and transmission control of transmission parameters of the uplink multi-user and multi-carrier signals.

One solution of the present invention performs optimization computation and control of the parameters of all the user transmitters and base-station receivers jointly and dynamically at realtime while the constraints are the reasonably kept at a minimum (no matter the explicitly or implicitly conditions). This solution is different from the commonly adopted technologies, which perform optimization computation and control of partial parameters or of all parameters in sequential steps. Optimization computation and control of part parameters or of all parameters in sequential steps assumes implicitly constraints so that the overall optimization cannot be achieved. The typical solutions include:

1) a mode with adaptive orthogonal frequency division multiplexing with transmitting antenna diversity and for allocating frequency resource to the users sequentially and averagely and for allocating power to different users averagely; and 2) a method for allocating frequency resource to the users sequentially but allocating power to different users dynamically.

One proposed solution of the present invention can realize the parameter optimization jointly, dynamically and with a minimum constraints and at the same time, takes into account system implementation complexity etc.

For the nomadic link (slow movement link) with multi-antenna, a near-instantaneous dynamic power allocation, bandwidth allocation and space subchannel allocation benefit for the realtime, and balanced use of the wireless communication resource of the uplink from terminals to a base-station and improve the frequency efficiency. Especially for broadband multiple access, it is necessary to optimize the control of parameters such as allocation of space and frequency subchannels and the corresponding power in order to adapt to the channel quality of different subchannels dynamically used by different users and adapt to the corresponding interference and noise statistic characteristic parameters so that the system capacity can be greatly improved. The communication method of dynamic space-frequency-division multiple-access for uplink from terminals to a base-station is one of the solutions based on the above knowledge.

At the same time, high system flexibility and good system resource allocation are necessary factors for a high performance system while the present invention enhances these factors. In addition, the performance of the communication system in this embodiment supports and provides different priority settings for a variety of rates required by different users. For terminals equipped with different antennas, the solution in this embodiment is a complicated problem. Thus, an embodiment of the present invention provides a control method, which supports good system flexibility and fine granularity of wireless communication system resource allocation and is adaptive to using different numbers of multi-antennas.

In addition to the above several characteristics, the adaptive antenna selection technology is an effective method to balance system complexity and system performance. Specifically, the processing complexity is reduced so that the feasibility of using a lot of antennas at the transmitter or the receiver is enhanced. The solution of the present invention covers this technology and proposes the specific parameter computation method for adaptive transmitter or receiver antenna selection technology.

The communication system and method of dynamic space-frequency-division multiple-access for uplink from terminals to a base-station in the present invention will be explained with reference to the drawings.

Figure 1:
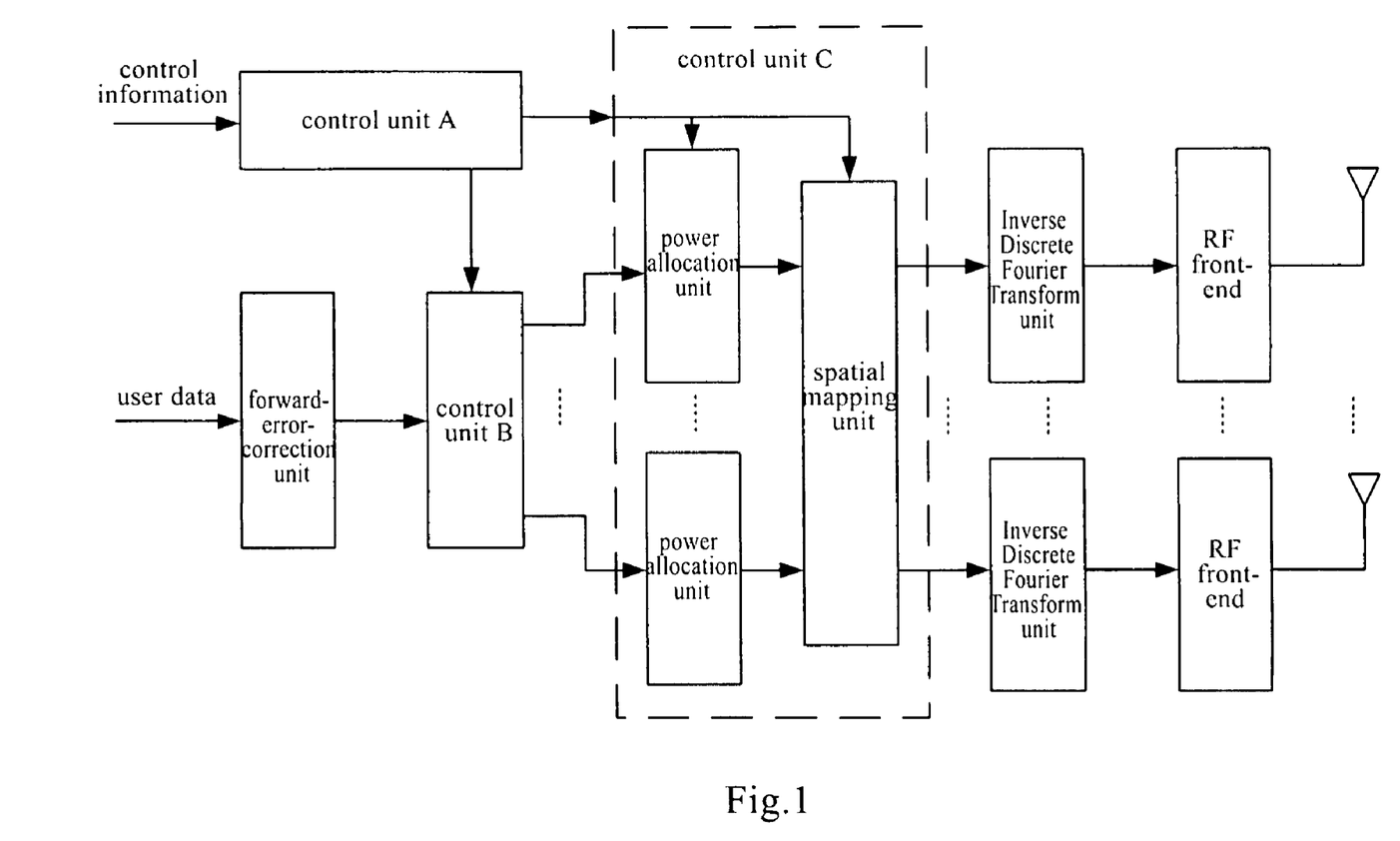
FIG. 1 is a diagram showing a transmitter of the $K^{th}$ terminal in a communication system of dynamic space-frequency-division multiple-access for uplink from terminals to a base-station.

The present invention relates to the communication system and method of dynamic space-frequency-division multiple-access for uplink from terminals to a base-station. FIG. 1 is a diagram showing a transmitter of the $K^{th}$ terminal in a communication system of dynamic space-frequency-division multiple-access for uplink from terminals to a base-station. This transmitter includes a forward-error-correction unit, control units A, B and C, multiple Inverse Discrete Fourier Transform units, multiple RF front-ends and the transmitting antennas.

Specifically, after the user data of the $K^{th}$ user pass the forward-error-correction unit, they will be series-parallel transformed and are mapped into predefined symbols.

The control unit A receives the control information from the base-station. The control information is the transmitting control information computed with the optimization function of the present invention.

Signal spatial mapping is a common knowledge for those skilled in the art. There are normally two modes: A) direct spatial mapping; B) eigen-vector beamforming.

In one embodiment of the present invention, the base-station performs the optimization computation with a different optimization function according to the two modes respectively and obtains the transmitting control information controlling terminals.

A) as for the spatial mapping mode with direct spatial mapping, the optimization function is described in equation (1):

$$\{T_{[k,i]}, R_{[i]}, C_k, p_{[k,i]}\} = \arg\max_{\{T_{[k,i]}, R_{[i]}, C_k, p_{[k,i]}\}} \sum_{j=1}^{N} \gamma_j \zeta_j \quad (1)$$

where $T_{[k,i]}$ represents the set of the transmitting antennas used by the $K^{th}$ terminal on the $i^{th}$ subcarrier;

$R_{[i]}$ represents the set of the receiving antennas used by the base-station on the $i^{th}$ subcarrier;

$C_k$ represents the set of the subcarriers used by the $K^{th}$ terminal;

$P_{[k,i]}$ represents the transmitting power of the $K^{th}$ terminal on the $i^{th}$ subcarrier.

It can be seen that for the spatial mapping mode with direct spatial mapping, the control information to be computed by the base-station includes $T_{[k,i]}$, $R_{[i]}$, $C_k$, $P_{[k,i]}$ and adaptive modulation mode parameter l.

In the above equation, $\gamma_k$ is the priority coefficient of the $K^{th}$ user.

1) when the channel has a full column rank:

$$\zeta_k \cong \sum_{i \in C_k} \log\left(\det\left(I_{|R_{[i]}|} + \left(\frac{p_{[k,i]}}{|T_{[k,i]}|\tilde{K}_{z(i)}}\tilde{H}_{[k,i]}\tilde{H}_{[k,i]}^H\right)\right.\right. \quad (2a)$$

-continued $$\left.\left. \left(I_{|R_{[i]}|} + \sum_{j \in U_i, j \neq k} \frac{p_{[j,i]}}{|T_{[j,i]}|\tilde{K}_{z(i)}}\tilde{H}_{[j,i]}\tilde{H}_{[j,i]}^H\right)^{-1}\right]\right)$$

in the equation (2), $I_{|R_{[i]}|}$ represents the unit matrix (square matrix) and the size of the matrix is $|R_{[i]}|$;

$\tilde{H}_{[k,i]}$ is the submatrix corresponding to the antenna selection according to the channel matrix, $K_{z_{[i]}}$ is the covariance matrix of the noise on the $i^{th}$ subcarrier, $\tilde{H}_{[j,i]}^H$ is the conjugate transpose of the $\tilde{H}_{[j,i]}$.

2) when the channel is not a full column rank:

$$\zeta_k \cong \sum_{i \in C_k} \log \frac{\det\left(\tilde{K}_{z_{[i]}} + \sum_{j \in U_i}\left(\frac{p_{[k,i]}}{|T_{[k,i]}|\tilde{K}_{z(i)}}\tilde{H}_{[k,i]}\tilde{H}_{[k,i]}^H\right)\right)}{\det\left(\tilde{K}_{z_{[i]}} + \sum_{j \in U_i, j \neq k}\left(\frac{p_{[j,i]}}{|T_{[j,i]}|}\tilde{H}_{[j,i]}\tilde{H}_{[j,i]}^H\right)\right)} \quad (2b)$$

the constraints are:

$$\sum_{i \in C_k} p_{[k,i]} \le P_k \quad (3)$$

$$|C_k| \le F$$

$$|R_i| \ge \sum_{k \in U_i} |T_{[k,i]}|$$

where $P_k$ represents the overall power of each subcarrier of the $K^{th}$ user;

F represents the constraint value of the number of subcarriers.

B) as for the spatial mapping mode with eigen-vector beamforming, the optimization function is described in equation (4):

$$\{R_{[i]}, C_k, p_{[k,i]}\} = \arg\max_{\{R_{[i]}, C_k, p_{[k,i]}\}} \sum_{j=1}^{N} \gamma_j \zeta_j \quad (4)$$

For the spatial mapping mode with eigen-vector beamforming, the control information to be computed by the base-station only includes $R_{[i]}$, $C_k$, $p_{[k,i]}$ and adaptive modulation mode parameter l.

$R_{[i]}$ represents the set of the receiving antennas used by the base-station on the $i^{th}$ subcarrier;

$C_k$, represents the set of the subcarriers used by the $K^{th}$ terminal;

$P_{[k,i]}$ represents the transmitting power of the $K^{th}$ terminal on the $i^{th}$ subcarrier.

It can be seen that for the spatial mapping mode with eigen-vector beamforming, the control information to be computed by the base-station only includes $R_{[i]}$, $C_k$, $P_{[k,i]}$ and adaptive modulation mode parameter l.

In the above equation, $\gamma_k$ is the priority coefficient of the Kth user.

1) when the channel has a full column rank:

$$\zeta_k \cong \sum_{i \in C_k} \log\left(\det\left(I_{|R_{[i]}|} + (H_{[k,i]} K_{x_{[k,i]}} H_{[k,i]}^H)\left(K_{z_{[i]}} + \sum_{j \in U_i, j \neq k} H_{[j,i]} K_{x_{[j,i]}} H_{[j,i]}^H\right)^{-1}\right)\right) \quad (5a)$$

in the equation (5), $I_{|R_{[i]}|}$ represents the unit matrix (square matrix) and the size of the matrix is $|R_{[i]}|$;

$\tilde{H}_{[k,i]}$ is the channel matrix of the $K^{th}$ terminal on the $i^{th}$ subcarrier, $K_{z_{[i]}}$ is the covariance matrix of the noise on the $i^{th}$ subcarrier, $K_{x_{[j,i]}}$ is the covariance matrix of $j^{th}$ terminal on the $i^{th}$ subcarrier signal, $\tilde{H}_{[j,i]}^H$ is the conjugate transpose of the $\tilde{H}_{[j,i]}$.

2) when the channel is not a full column rank:

$$\zeta_k \cong \sum_{i \in C_k} \log \frac{\det\left(K_{z_{[i]}} + \sum_{j \in U_i} H_{[j,i]} K_{x_{[j,i]}} H_{[j,i]}^H\right)}{\det\left(K_{z_{[i]}} + \sum_{J \in U_i, j \neq k} H_{[j,i]} K_{x_{[j,i]}} H_{[j,i]}^H\right)} \quad (5b)$$

the constraints are:

$$\sum_{i \in C_k} Tr(K_{x_{[k,i]}}) \leq P_k \quad (6)$$

$$|C_k| < F$$

$$|R_i| \geq \sum_{k \in U_i} |T_{[k,i]}|$$

where Tr represents the matrix trace computation;

$P_k$ represents the constraints value of the overall power of each subcarrier of the $K^{th}$ user;

F represents the constraint value of the number of subcarriers.

When the system adopts the spatial mapping mode with eigen-vector beamforming, $K_{x_{[k,i]}}$ is obtained by using the following equation (7) in the control unit A:

$$K_{x_{[k,i]}} = v_{[i]_k} v_{[i]_k}^H \quad (7)$$

where $v_{[i]_k}$ is the beamforming vector of the $i^{th}$ subcarrier of the $K^{th}$ user and $v_{[i]_k}^H$ is the conjugation inversion of the beamforming vector $v_{[i]_k}$.

The control unit A of the user terminal can use the channel information and get the beamforming vector $v_{[i]_k}$ by singular decomposition of the channel matrix, where $v_{[i]_k}$ represents the beamforming vector $v_{[i]_k}$ of the $i^{th}$ subcarrier of the $K^{th}$ user and is obtained by computing the following operation:

$$H_{[i]k} = U_{[i]k} \Lambda_{[i]k} V_{[i]k}^H \quad (8)$$

where $H_{[i]k}$ is the channel matrix of the $K^{th}$ terminal on the $i^{th}$ subcarrier, $U_{[i]k}$ is the left unitary matrix of the channel matrix decomposition, $\Lambda_{[i]k}$ is the singular value diagonal matrix and $V_{[i]k}^H$ is the right unitary matrix of the channel matrix decomposition.

The above is the optimization function used by the base-station to compute the control information, and at the same time, the base-station computes the signal/noise power ratio ($SINR_o^b$ is the ratio of signal to the noise and interference per bit). According to the error rate requirement of the system, the modulation modes of the signal are chosen according to the following equations:

a) for 4QAM:

$$P_{4QAM}^b = Q\left(\sqrt{\frac{SINR_o^b}{2}}\right) \quad (9)$$

$$Q(x) = \frac{1}{\sqrt{2\pi}} \int_x^\infty e^{-y^2/2} dy$$

where b) for 16QAM:

$$P_{16QAM}^b = \frac{1}{2}\left(Q\left(\sqrt{\frac{SINR_o^b}{10}}\right) + Q\left(3\sqrt{\frac{SINR_o^b}{10}}\right)\right) \quad (10)$$

c) for 64QAM:

$$P_{64QAM}^b = \frac{2}{3}\left(Q\left(\sqrt{1.8 SINR_o^b}\right)\right) \quad (11)$$

The modulation mode which has the largest transmission rate and can meet the system error rate requirement will be chosen and the adaptive modulation mode parameter 1 is determined and sent to the control unit A of the user terminal.

The specific process of the user terminal controlling with the above control information will be explained in detail.

In the present invention, the feedback of the control information can be realized by any common technologies. Generally, the control information is fed back in this way: the control information is coded and put in the specific control frame and afterwards, the control frame is processed such as being channel coded and modulated, the signal then is up-converted to a radio frequency and sent to the user terminal.

Accordingly, after the user terminal receives the control information from the base-station, it will down-convert the RF signal of the received signal to the baseband and then performs detection and decoding in order to obtain the control information and then the control information is sent to the control unit A.

The control unit A of the user terminal sends the parameter $C_k$ and the adaptive modulation mode parameter 1 to the control unit B; and sends the parameter $p_{[k,i]}$ to the control unit C.

It should be noted that when the system adopts the spatial mapping mode with direct spatial mapping, the parameter $T_{[k,i]}$ will be sent to the control unit C as the control information.

When the system adopts the spatial mapping mode with eigen-vector beamforming, the control unit A will compute the beamforming eigen-vector $v_{[i]_k}$ by using the channel information and will send $v_{[i]_k}$ to the control unit C as the control information. While when the system adopts the spatial mapping mode with direct spatial mapping, the control unit A will not compute the beamforming eigen-vector $v_{[i]_k}$.

Then the control unit B will modulate the signal using the received adaptive modulation mode parameter l as the control information and the modulation modes can be any of the above QPSk, 16-QAM and 64-QAM. The modulation mode adopted in the present invention is well known to those skilled in the art and will not be described in detail.

At the same time, the control unit B allocates the symbols from the forward-error-correction unit to different subcarriers according to the parameter $C_k$.

The control unit C includes power allocation units each corresponding to one of the multiple signal streams from the control unit B (each signal stream is on one subcarrier), and a spatial mapping unit, which can be an eigen-vector beamforming unit or a direct spatial mapping unit.

Each power allocation unit performs the signal power adjusting on signal stream on the corresponding subcarrier according to the parameter $P_{[k,i]}$ and sends the processed signal stream to the spatial mapping unit. The power allocation ratio obeys the parameter $P_{[k,i]}$.

The spatial mapping unit obtains the signal streams from each power allocation unit and performs the spatial mapping processing according to different spatial mapping modes and maps the signal streams on different subcarriers to the corresponding antennas.

Specifically, the spatial mapping unit maps the signal streams on different subcarriers according to the direct mapping mode or the eigen-vector beamforming mapping mode.
  i) If the direct mapping mode is adopted, the control unit C receives $T_{[k,i]}$ and maps the signal streams on different subcarriers to the antennas according to $T_{[k,i]}$. At this time, the number of the signal streams is the same as the number of the transmitting antennas and the number of the signal streams is determined according to the parameter $T_{[k,i]}$.
  ii) If the eigen-vector beamforming mapping mode is adopted, the control unit C performs the signal processing of the eigen-vector beamforming on signal streams on different subcarriers according to $v_{[i]_k}$. At this time, the spatial mapping processing of the signal streams is determined according to the parameter $v_{[i]_k}$.

Then the Inverse Discrete Fourier Transform units generate the signal for orthogonal frequency division multiple-access, and then insert the cyclic prefix in the modulated signal.

Then each RF front-end among the multiple RF front-ends up-converts the corresponding baseband signal with cyclic prefix to create the corresponding RF signal, which will be transmitted from the corresponding transmitting antenna.

Figure 2:
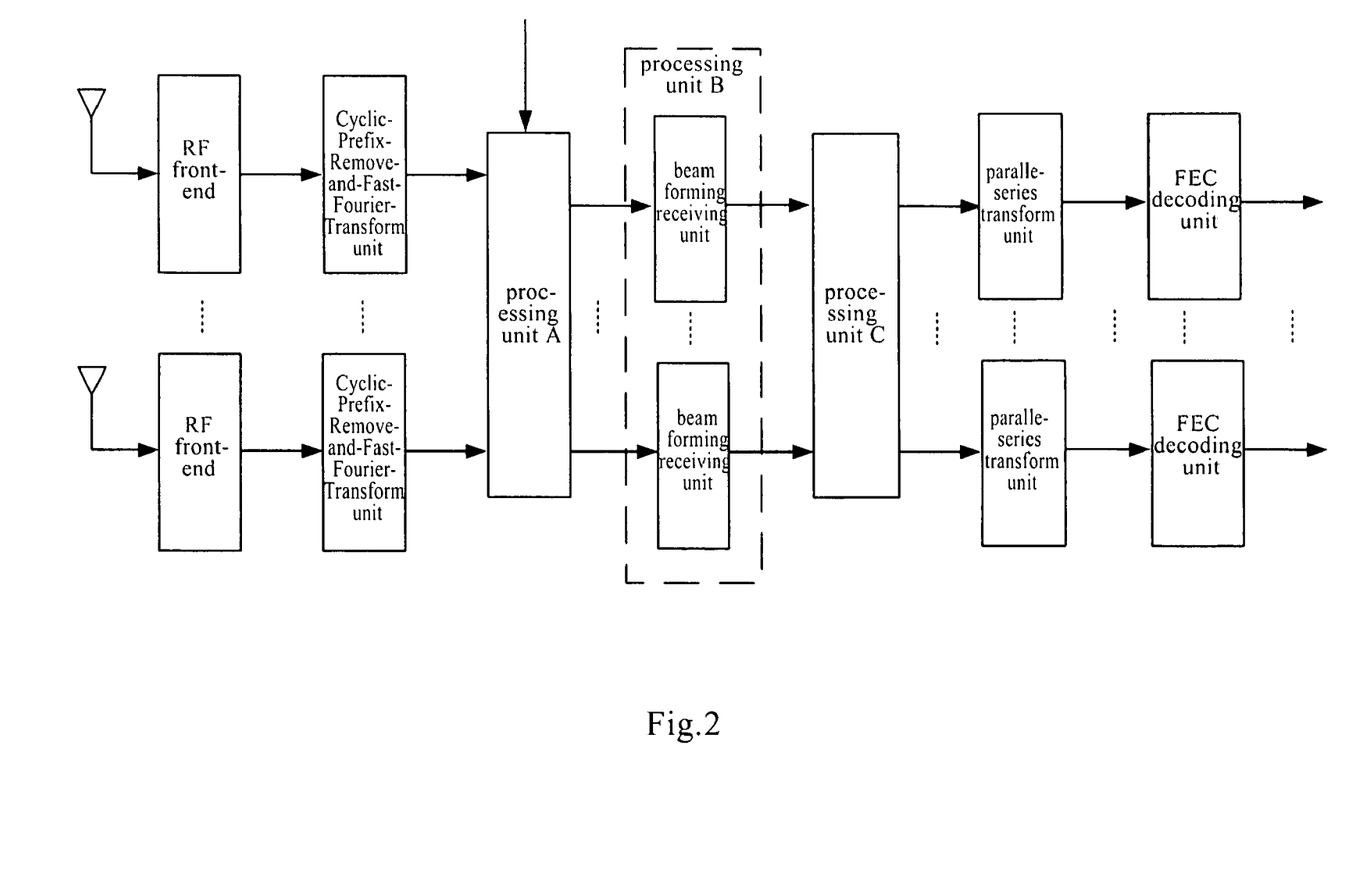
FIG. 2 is a diagram showing architecture of a receiver in a base-station in the communication system of dynamic space-frequency-division multiple-access for uplink from terminals to a base-station.

FIG. 2 is a diagram showing architecture of a receiver in a base-station in a communication system of dynamic space-frequency-division multiple-access for uplink from terminals to a base-station.

Firstly, the RF front-end of the base-station down-converts the signal received from the antenna and gets the corresponding baseband signal.

Then, the Cyclic-Prefix-Remove-and-Fast-Fourier-Transform unit removes the cyclic prefix of each signal and Fourier-transforms each signal (each corresponding to one subcarrier).

In the processing unit A shown in FIG. 2, the signals after the Fourier transformation are mapped according to $R_{[i]}$ and then the mapping results are sent to the corresponding beamforming receiving units in the processing unit B. The processing unit C shown in FIG. 2 performs multiuser signal detection on the subcarriers from the beamforming receiving units respectively.

Then the multiuser detection results of different subcarriers are parallel-series transformed in the parallel-series transform unit. The signals of different users are decoded in the FEC decoding unit respectively, then the signal process is finished. The modulation mode parameter l of different space frequency channel of each user and the subset $R_{[i]}$ of receiving antennas of different subcarriers are the control variables adopted by the base-station receiver when it processes the signals.

Figure 3:
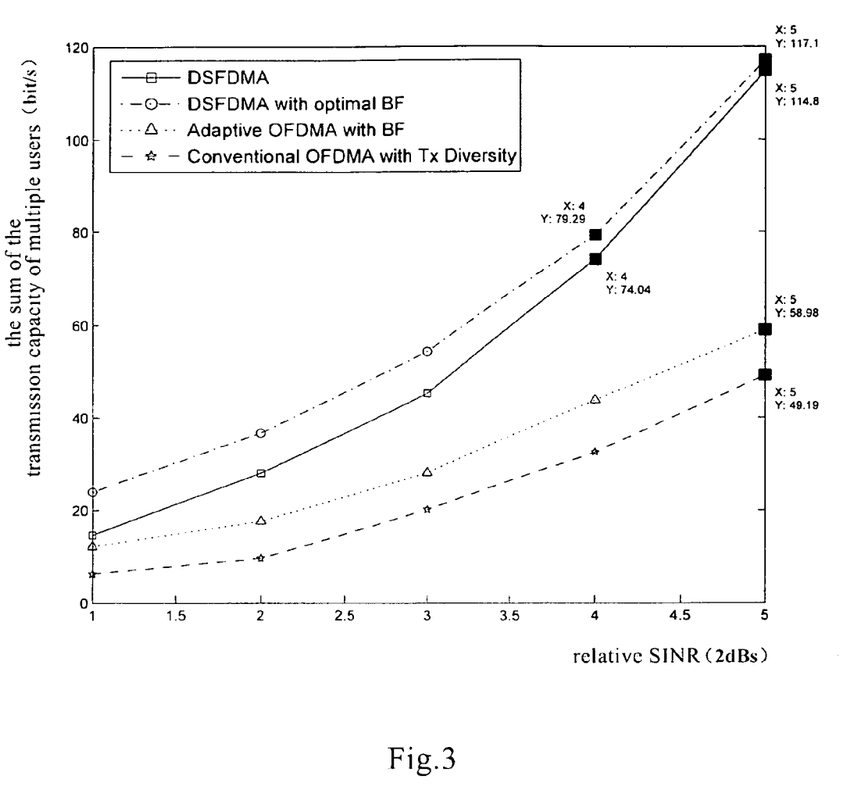
FIG. 3 and FIG. 4 show simulation results of overall communication capacity of systems with different wireless communication uplink control modes.
Figure 4:
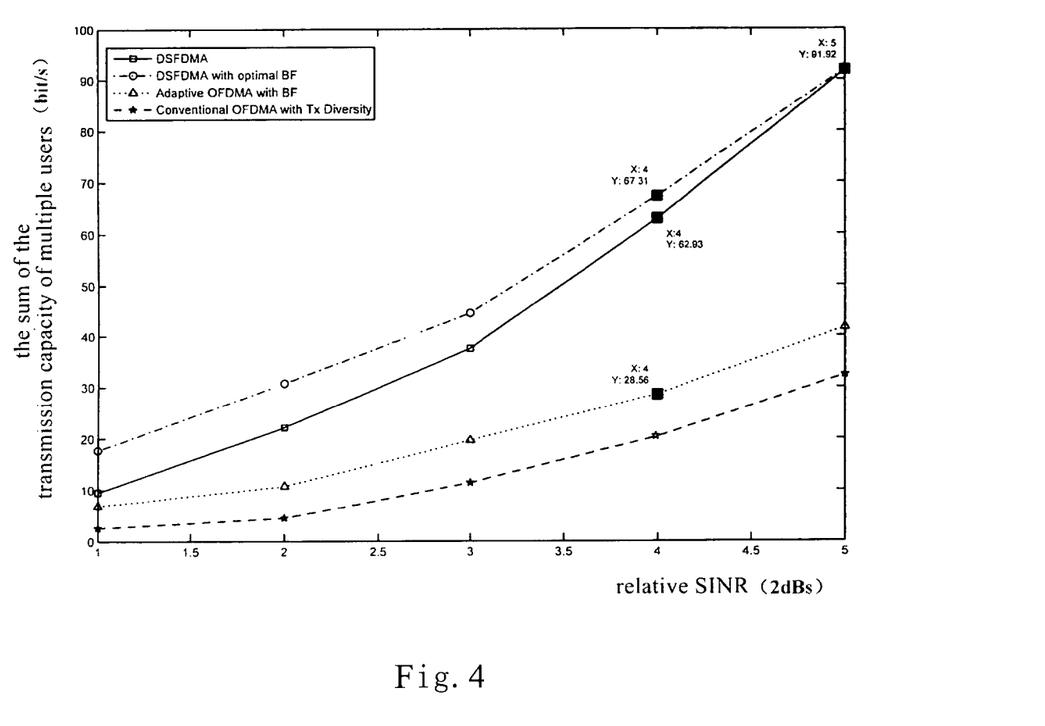

FIG. 3 and FIG. 4 show simulation results of overall system capacity when a wireless communication uplink is in different control methods. They show the overall communication capacity of the system under the cellular wireless communication uplink control method described in the present invention and computed with a Monte Carlo method. They also show the comparison of the system capacity with that under other control methods.

The simulation computation compares the four kinds communication system mechanisms, including the present invention. The notation, DSFDMA, represents the preferred communication method in the present invention, which is the dynamic space-frequency division multiple-access communication adopting the beamforming computation recommended in the present invention. The notation, DSFDMA with optimal BF, represents the dynamic space-frequency division multiple-access of the present invention adopting an optimum beamforming computation.

Adaptive OFDMA with BF (adaptive orthogonal frequency division multiple-access with beamforming method) represents the scenario when the multicarrier transmission adopts the beamforming with adaptive power control. The difference is that this solution allocates frequency resource to users equally and sequentially though it employs an adaptive power control, while the present invention allocates the frequency and spatial resource and the power jointly and in the same time takes into account the adaptive antenna selection method of different subcarriers.

Conventional OFDMA with Tx Diversity (adaptive orthogonal frequency division multiple-access with transmitting antenna diversity) represents allocating frequency resource to the users sequentially and equally and allocating equal power to different users.

In FIG. 3, the simulated system capacity is computed under the following scenario: the number of the users is 10, the number of the subcarriers is 10, the priority of the users is (1, 1, 1, 1, 1, 1, 1, 1, 1, 1,) (i.e. all users have the same priority), the number of the transmitting antennas of each user is 3, the number of the receiving antennas of the base-station is 4.

In FIG. 4, the simulated system capacity is computed with the following scenario: the number of the users is 12, the number of the subcarriers is 8, the priority of the users is (1, 1, 1, 1, 1, 1, 1, 1, 1,) (i.e. all users have the same priority), the number of the transmitting antennas of each user is 3, the number of the receiving antennas of the base-station is 4.

FIG. 3 and FIG. 4 show that the proposed communication method adopting the simplified beamforming computation method recommended by the present invention is asymptotically close to the one adopting the optimum beamforming computation method. The simplified beamforming computation method benefits the feasibility of the system so that it can well handle the fast changes of the channel, noise and interference. The characteristics of the present invention will be more obvious when the numbers of the users and subcarriers are comparable or when the number of the users is larger than that of the subcarriers. For the same antenna configuration, the overall system capacity under the control method of the present invention is higher than those of the following two methods: 1) a method for allocating frequency resource to the users equally and sequentially at any transmission time interval and with adaptive power control for different subcarrier; 2) a method allocating frequency resource to the users sequentially and equally and allocating same power to different users.

The present invention takes into account and makes use of the characteristics of uplink multiuser space-time channel and statistical information of interference or noise. The signal transmitting control method adaptively and dynamically adjusts according to different spatial-temporal channel conditions and makes a full use of the diversity of channels due to multi-users, multi-carriers and multi-antennas. The solution of the present invention enhances the overall system capacity and enables the cellular wireless communication uplink to support more users at the same time.

At the same time, the present invention provides the function of priority setting for users and improves the system flexibility. This function provides the control layer above the physical layer with a flexible priority control port.

Further, the adaptivity of the wireless uplink transmission method is feasible to the system for the non-licensed spectrum or needing flexible frequency adjustment.

The invention claimed is:

1. A communication system of dynamic space-frequency-division multiple-access for uplink from terminals to a base-station, comprising a base-station and multiple terminals, wherein, the base-station, according to a spatial mapping mode, performs an optimization computation using an optimization function in order to obtain control information for controlling terminals;

the user terminal, after receiving the control information, controls the transmitting mode using the control information, wherein, when the spatial mapping mode is the direct mapping, the following equation is used to perform optimization computation:

$$\{T_{[k,i]}, R_{[i]}, C_k, p_{[k,i]}\} = \arg\max_{\{T_{[k,i]}, R_{[i]}, C_k, p_{[k,i]}\}} \sum_{j=1}^{N} \gamma_j \zeta_j,$$

$T_{[k,i]}$ represents the set of the transmitting antennas used by the $K^{th}$ terminal on the $i^{th}$ subcarrier;

$R_{[i]}$ represents the set of the receiving antennas used by the base-station on the $i^{th}$ subcarrier;

$C_k$ represents the set of the subcarriers used by the $K^{th}$ terminal;

$p_{[k,i]}$ represents the transmitting power of the $K^{th}$ terminal on the $i^{th}$ subcarrier;

$\gamma_k$ is the priority coefficient the $K^{th}$ user, $$\zeta_k \cong \sum_{i \in C_k} \left( \log \frac{\det\left(\tilde{K}_{z_{[i]}} + \sum_{j \in U_i} \left(\frac{p_{[k,i]}}{|T_{[k,i]}|\tilde{K}_{z(i)}} \tilde{H}_{[k,i]} \tilde{H}_{[k,i]}^H\right)\right)}{\det\left(\tilde{K}_{z_{[i]}} + \sum_{j \in U_i, j \neq k} \left(\frac{p_{[j,i]}}{|T_{[j,i]}|} \tilde{H}_{[j,i]} \tilde{H}_{[j,i]}^H\right)\right)} \right),$$

the constraints are:

$$\sum_{i \in C_k} p_{[k,i]} \leq P_k$$
$$|C_k| \leq F$$
$$|R_i| \geq \sum_{k \in U_i} |T_{[k,i]}|$$

where $P_k$ represents the overall power of each subcarrier of the $K^{th}$ user;

F represents the constraint value of the number of subcarriers;

$I_{|R_{[i]}|}$ represents the unit matrix (square matrix) and the size of the matrix is $|R_{[i]}|$;

$\tilde{H}_{[k,i]}$ is the submatrix corresponding to the antenna selection according to the channel matrix;

$K_{z_{[i]}}$ is the covariance matrix of the noise on the $i^{th}$ subcarrier;

$\tilde{H}_{[j,i]}^H$ is the conjugate transpose of the $\tilde{H}_{[j,i]}$.

2. The system according to claim 1, wherein the control information comprises: a set of transmitting antennas used by the each terminal on each subcarrier, a set of receiving antennas used by a base-station on each subcarrier, a set of subcarriers used by each terminal, transmitting power of each terminal on each subcarrier and a modulation mode used by each terminal on each subcarrier.

3. The system according to claim 2, wherein the transmitter comprises a forward-error-correction unit, a first control unit, a second control unit, a third control unit, a plurality of Inverse Discrete Fourier Transform units, a plurality of RF front-ends and transmitting antennas each connected with a corresponding RF front-end, the first control unit is for receiving the control information from the base-station and for transmitting the set of the subcarriers and the adaptive modulation mode to the second control unit, and for transmitting the transmitting power of the terminal on each subcarrier and the set of the transmitting antennas on each subcarrier to the third control unit;

the forward-error-correction unit is for forward-error-correcting the user data, series-parallel transforming the user data and mapping the user data into predefined symbols;

the second control unit is for modulating the symbols from the forward-error-correction unit respectively according to the control information received from the first control unit, for allocating the symbols from the forward-error-correction unit to different subcarriers according to the control information received from the first control unit;

the third control unit comprises multiple power allocation units and a spatial mapping unit, wherein the power allocation units are for performing the signal power adjusting on signal streams on the corresponding subcarriers according to the control information received from the first control unit, and the spatial mapping unit is for mapping the power adjusted signal streams on different subcarriers to the corresponding antennas according to the control information received from the first control unit;

each Inverse Discrete Fourier Transform unit generates the signal for orthogonal frequency division multiple-access on the signal streams, which are transmitted from the corresponding antennas and inputted from the third control unit, and then adds the cyclic prefix to the modulated signal;

each RF front-end receives the corresponding baseband signal with cyclic prefix and up-converts the received baseband signal to the corresponding RF signal, which is transmitted from the corresponding transmitting antenna.

4. A communication method of dynamic space-frequency-division multiple-access for uplinks from terminals to a base-station, comprising the following operations:

at the base-station, performing an optimization computation using an optimization function according to a spatial mapping mode, in order to obtain control information for controlling terminals;

at the terminal, controlling a transmitting mode using the control information after receiving the control information, wherein, when the spatial mapping mode is the direct mapping, the following equation is used to perform optimization computation:

$$\{T_{[k,i]}, R_{[i]}, C_k, p_{[k,i]}\} = \arg\max_{\{T_{[k,i]}, R_{[i]}, C_k, p_{[k,i]}\}} \sum_{j=1}^{N} \gamma_j \zeta_j,$$

$T_{[k,i]}$ represents the set of the transmitting antennas used by the $K^{th}$ terminal on the $i^{th}$ subcarrier;

$R_{[i]}$ represents the set of the receiving antennas used by the base-station on the $i^{th}$ subcarrier;

$C_k$ represents the set of the subcarriers used by the $K^{th}$ terminal;

$p_{[k,i]}$ represents the transmitting power of the $K^{th}$ terminal on the $i^{th}$ subcarrier;

$\gamma_k$ is the priority coefficient of the $K^{th}$ user, $$\zeta_k \cong \sum_{i \in C_k} \left[ \log \frac{\det\left(K_{z_{[i]}} + \sum_{j \in U_i} H_{[j,i]} K_{x_{[j,i]}} H_{[j,i]}^H\right)}{\det\left(K_{z_{[i]}} + \sum_{j \in U_i, j \neq k} H_{[j,i]} K_{x_{[j,i]}} H_{[j,i]}^H\right)} \right]$$

the constraints are:

$$\sum_{i \in C_k} Tr(K_{x_{[k,i]}}) \leq P_k$$
$$|C_k| < F$$
$$|R_i| \geq \sum_{k \in U_i} |T_{[k,i]}|$$

where $P_k$ represents the overall power of each subcarrier of the $K^{th}$ user;

F represents the constraint value of the number of subcarriers;

$I_{|R_{[i]}|}$ represents the unit matrix (square matrix) and the size of the matrix is $|R_{[i]}|$;

$\tilde{H}_{[k,i]}$ is the submatrix corresponding to the antenna selection according to the channel matrix;

$K_{z_{[i]}}$ is the covariance matrix of the noise on the $i^{th}$ subcarrier;

$\tilde{H}_{[j,i]}{}^H$ is the conjugate transpose of the $\tilde{H}_{[j,i]}$.

5. The method according to claim 4, wherein
the control information comprises: a set of transmitting antennas used by the each terminal on each subcarrier, a set of receiving antennas used by a base-station on each subcarrier, a set of subcarriers used by each terminal, transmitting power of each terminal on each subcarrier and a modulation mode used by each terminal on each subcarrier.

6. The method according to claim 5, wherein the second step comprises the following steps:

forward-error-correcting the user data of the terminal, series-parallel transforming the user data and mapping the forward-error-corrected user data into predefined symbols;

modulating the symbols respectively according to the control information, and allocating the predefined symbols to different subcarriers according to the control information;

performing the signal power adjusting on signal streams at the corresponding subcarriers according to the control information, and mapping the power adjusted signal streams on different subcarriers to the corresponding antennas according to the control information;

performing the orthogonal multicarrier modulation on the signal streams, which are mapped to different transmitting antennas, and then adding the cyclic prefix to the modulated signal;

up-converting each signal stream with cyclic prefix to a corresponding RF signal, which is transmitted from the corresponding transmitting antenna.

7. A communication system of dynamic space-frequency-division multiple-access for uplink from terminals to a base-station, comprising a base-station and multiple terminals, wherein, the base-station, according to a spatial mapping mode, performs an optimization computation using an optimization function in order to obtain control information for controlling terminals;

the user terminal, after receiving the control information, controls the transmitting mode using the control information, wherein, when the spatial mapping mode is the eigen-vector beamforming, the following equation is used to perform optimization computation:

$$\{R_{[i]}, C_k, p_{[k,i]}\} = \arg\max_{\{R_{[i]}, C_k, p_{[k,i]}\}} \sum_{j=1}^{N} \gamma_j \zeta_j,$$

$R_{[i]}$ represents the set of the receiving antennas used by the base-station on the $i^{th}$ subcarrier;

$C_k$ represents the set of the subcarriers used by the $K^{th}$ terminal;

$p_{[k,i]}$ represents the transmitting power of the $K^{th}$ terminal on the $i^{th}$ subcarrier;

$\gamma_k$ is the priority coefficient of the $K^{th}$ user, $$\zeta_k \cong \sum_{i \in C_k} \left[ \log \frac{\det\left(\tilde{K}_{z_{[i]}} + \sum_{j \in U_i}\left(\frac{p_{[k,i]}}{|T_{[k,i]}|\tilde{K}_{z(i)}}\tilde{H}_{[k,i]}\tilde{H}_{[k,i]}^H\right)\right)}{\det\left(\tilde{K}_{z_{[i]}} + \sum_{j \in U_i, j \neq k}\left(\frac{p_{[j,i]}}{|T_{[j,i]}|}\tilde{H}_{[j,i]}\tilde{H}_{[j,i]}^H\right)\right)} \right],$$

the constraints are:

$$\sum_{i \in C_k} p_{[k,i]} \leq P_k$$
$$|C_k| \leq F$$
$$|R_i| \geq \sum_{k \in U_i} |T_{[k,i]}|$$

where Tr represents the matrix trace computation;
  $P_k$ represents the constraints value of the overall power of each subcarrier of the $K^{th}$ user;
  F represents the constraint value of the number of subcarriers;
  $I_{|R_{[i]}|}$ represents the unit matrix (square matrix) and the size of the matrix is $|R_{[i]}|$;
  $\tilde{H}_{[k,i]}$ is the channel matrix of the $K^{th}$ terminal on the $i^{th}$ subcarrier;
  $K_{z_{[i]}}$ is the covariance matrix of the noise on the $i^{th}$ subcarrier;
  $K_{x_{[j,i]}}$ is the covariance matrix of the $j^{th}$ terminal signal on the $i^{th}$ subcarrier;
  $\tilde{H}_{[j,i]}^H$ is the conjugate transpose of the $\tilde{H}_{[j,i]}$.

8. The system according to claim 7, wherein, when the spatial mapping mode is the eigen-vector beamforming, the control information comprises:
  a set of receiving antennas used by a base-station on each subcarrier, a set of subcarriers used by each terminal, transmitting power of each terminal on each subcarrier and a modulation mode used by each terminal on each subcarrier.

9. The system according to claim 8, wherein the transmitter comprises a forward-error-correction unit, a first control unit, a second control unit, a third control unit, a plurality of Inverse Discrete Fourier Transform units, a plurality of RF front-ends and transmitting antennas each connected with a corresponding RF front-end,
  the first control unit is for receiving the control information from the base-station and for sending the set of the subcarriers and the adaptive modulation mode to the second control unit as the control information, and for computing the beamforming vector according to the channel information and for sending the beamforming vector and the transmitting power of the terminal on each subcarrier to the third control unit as the control information;
  the forward-error-correction unit is for forward-error-correcting the user data of the terminal, series-parallel transforming the user data and mapping the forward-error-corrected user data into predefined symbols;
  the second control unit is for modulating the symbols from the forward-error-correction unit respectively according to the control information from the first control unit, for allocating the symbols from the forward-error-correction unit to different subcarriers according to the control information from the first control unit;
  the third control unit comprises multiple power allocation units and a spatial mapping unit, wherein the power allocation units are for performing the signal power adjusting on signal streams on the corresponding subcarriers according to the control information from the first control unit, and the spatial mapping unit is for performing the eigen-vector beamforming on the power adjusted signal streams on different subcarriers according to the control information from the first control unit;
  each Inverse Discrete Fourier Transform unit generates the signal for orthogonal frequency division multiple-access, which are transmitted from the corresponding antennas and inputted from the third control unit, and then adds the cyclic prefix to the modulated signal;
  each RF front-end up-converts the corresponding baseband signal with cyclic prefix to the corresponding RF signal, which is transmitted from the corresponding transmitting antenna.

10. A communication method of dynamic space-frequency-division multiple-access for uplinks from terminals to a base-station, comprising the following operations:
  at the base-station, performing an optimization computation using an optimization function according to a spatial mapping mode, in order to obtain control information for controlling terminals;
  at the terminal, controlling a transmitting mode using the control information after receiving the control information, wherein,
  when the spatial mapping mode is the eigen-vector beamforming, the following equation is used to perform optimization computation:

$$\{R_{[i]}, C_k, p_{[k,i]}\} = \arg\max_{\{R_{[i]}, C_k, p_{[k,i]}\}} \sum_{j=1}^{N} \gamma_j \zeta_j,$$

$R_{[i]}$ represents the set of the receiving antennas used by the base-station on the $i^{th}$ subcarrier;
$C_k$ represents the set of the subcarriers used by the $K^{th}$ terminal;
$p_{[k,i]}$ represents the transmitting power of the $K^{th}$ terminal on the $i^{th}$ subcarrier;
$\gamma_k$ is the priority coefficient of the $K^{th}$ user, $$\zeta_k \cong \sum_{i \in C_k} \left[ \log \frac{\det\left(K_{z_{[i]}} + \sum_{j \in U_i} H_{[j,i]} K_{x_{[j,i]}} H_{[j,i]}^H\right)}{\det\left(K_{z_{[i]}} + \sum_{j \in U_i, j \neq k} H_{[j,i]} K_{x_{[j,i]}} H_{[j,i]}^H\right)} \right]$$

the constraints are:

$$\sum_{i \in C_k} Tr(K_{x_{[k,i]}}) \leq P_k$$
$$|C_k| < F$$
$$|R_i| \geq \sum_{k \in U_i} |T_{[k,i]}|$$

where Tr represents the matrix trace computation;

$P_k$ represents the constraints value of the overall power of each subcarrier of the $K^{th}$ user;

F represents the constraint value of the number of subcarriers;

$I_{|R_{[i]}|}$ represents the unit matrix (square matrix) and the size of the matrix is $|R_{[i]}|$;

$\tilde{H}_{[k,i]}$ is the channel matrix of the $K^{th}$ terminal on the $i^{th}$ subcarrier;

$K_{z_{[i]}}$ is the covariance matrix of the noise on the $i^{th}$ subcarrier;

$K_{x_{[j,i]}}$ is the covariance matrix of the $j^{th}$ terminal signal on the $i^{th}$ subcarrier;

$\tilde{H}_{[j,i]}^{H}$ is the conjugate transpose of the $\tilde{H}_{[j,i]}$.

11. The method according to claim 10, wherein, when the spatial mapping mode is the eigen-vector beamforming, the control information comprises:

a set of receiving antennas used by a base-station on each subcarrier, a set of subcarriers used by each terminal, transmitting power of each terminal on each subcarrier and a modulation mode used by each terminal on each subcarrier.

12. The method according to claim 11, wherein the second step comprises the following steps:

forward-error-correcting the user data of the terminal, series-parallel transforming the user data and mapping the forward-error-corrected user data into predefined symbols;

modulating the symbols respectively according to the control information for the adaptive modulation mode, and allocating the symbols to different subcarriers according to the control information for the set of the subcarriers used by the terminal;

performing the signal power adjusting on signal streams on the corresponding subcarriers according to the control information, and performing the eigen-vector beamforming on the power adjusted signal streams on different subcarriers according to the control information;

performing the orthogonal multicarrier modulation on the signal streams respectively, which are processed by the beamforming, and then adding the cyclic prefix to the modulated signal;

up-converting each signal stream inserted with a cyclic prefix to a corresponding RF signal, which is transmitted from the corresponding transmitting antenna.

\* \* \* \* \*